United States Patent [19]

Kinsman et al.

[11] Patent Number: 4,514,069

[45] Date of Patent: Apr. 30, 1985

[54] PHOTOGRAPHIC SHEET PROCESSOR HAVING LARGE DIAMETER ROLLING SURFACES

[75] Inventors: Gordon F. Kinsman, Billerica; Ronald F. Lambert, Wayland; David A. Morrison, Framingham, all of Mass.

[73] Assignee: Polaroid Corporation, Cambridge, Mass.

[21] Appl. No.: 566,332

[22] Filed: Dec. 28, 1983

[51] Int. Cl.[3] .................................... G03B 9/02

[52] U.S. Cl. .................................... 354/304

[58] Field of Search .................... 354/83, 84, 85, 86, 354/87, 301, 303, 304, 305

[56] References Cited

U.S. PATENT DOCUMENTS

| | | | |
|---|---|---|---|
| 2,789,488 | 4/1957 | Eloranta | 354/304 |
| 3,335,652 | 8/1967 | Erikson | 354/304 |
| 3,690,239 | 9/1972 | Kindig | 354/86 |
| 3,788,205 | 1/1974 | Pasieka et al. | 354/304 |
| 4,338,016 | 7/1982 | Peck et al. | 354/303 |

*Primary Examiner*—A. A. Mathews

*Attorney, Agent, or Firm*—David R. Thornton

[57] ABSTRACT

Processing apparatus for spreading processing fluid uniformly over photochemical layers on one or more photographic sheets by progressive pressure applied by rolling surfaces provided on large diameter calendering members. To achieve the large diameter rolling surface, the calendering members are defined by cylindrical sectors having a circumferential length corresponding to the length of sheets to be processed and supported by means effective to bring the respective cylindrical surfaces of both members into contact with opposite sides of the processed sheets. In one embodiment, the calendering members are semi-cylindrical, whereas in another embodiment the members are quadrants of cylinders.

14 Claims, 12 Drawing Figures

PHOTOGRAPHIC SHEET PROCESSOR HAVING LARGE DIAMETER ROLLING SURFACES

BACKGROUND OF THE INVENTION

This invention relates to apparatus for processing exposed photographic sheet materials. More particularly, it concerns apparatus for spreading processing fluid uniformly over a photochemical layer or layers on one or more such sheets by progressive pressure applied by rolling surfaces of maximum radii.

Self-developing film units are well known in the instant photography art and most commonly employ an assembly of sheet components sandwiching layered photochemical compositions and various processing adjuncts including a rupturable pod of processing fluid in an amount selected to assure complete coverage of the photochemical layers by the fluid supplied in the pod. The processing fluid pod is traditionally located at the leading end of the film unit in the context of its direction of feed through a processing gap defined by a nip between a pair of processing rollers, for example. Upon entry of the leading edge of the unit into the roller nip, the processing fluid pod is ruptured and the contents thereof spread over the remaining area of the photochemicals carried between the sheets of the film unit.

It has been recognized by those familiar with the instant photography art that a combination of processing fluid rheology and chemical action between the processing fluid and the sheet carried photochemicals results in an optimum photograph where the radius of rolling surface defined by the processing roller pair is enlarged to the maximum extent possible in keeping with the spacial constraints of the apparatus in which the processing apparatus is used. In commercially available, hand-carried, instant cameras designed for self-developing film units, for example, the size of the processing rollers is dictated primarily by the space available in the camera and is limited to a roller diameter requiring several revolutions of the rollers for processing passage of a single film unit through the nip of the rollers. For this reason, it is also very important that the surfaces of the processing rollers be isolated from contact by the processing fluid in order to ensure that the roller surfaces will remain truly cylindrical to be effective in the processing fluid spreading operation. This requirement, in turn, has necessitated preassembly of film units in a manner to assure retention of all processing fluid between the traditional two sheets employed in film units of this type.

In larger industrial and/or institutional types of cameras designed for the use of self-developing film units, the diameter of at least one of the processing rollers has been increased to a point where the length of the film unit is equated to the roller circumference in a manner such that a processing pass of the film unit requires only a single revolution of the large diameter roller. The use of such large diameter processing rollers not only enhances the photographic image obtained as a result of a more uniform spread of the processing fluid, but in addition, allows for a simplified assembly of components in the film unit. In this latter respect, it is to be noted that the quantity of processing fluid supplied in each rupturable pod of each film unit must be more than that needed to cover the image area of the film sheets, thus presenting a problem of how to handle the residual processing fluid. Traditionally, this problem has been approached by providing a processing fluid trap at the trailing end of a preassembled instant film unit, for example. Where single revolution processing rollers have been used, however, the need for the trap has been reduced to a point where residual fluid can be accommodated very simply by a trailing end extension of the film sheets. The danger of the residual processing fluid fouling the roller surfaces is avoided by a pocket in the large diameter roller at the point thereof where the trailing edge of the film unit registers.

While the advantages of large diameter rolling surfaces for processing instant film units have been recognized, there is a need for the attainment of such large diameter surfaces while at the same time reducing the space required for accommodating such surfaces.

SUMMARY OF THE INVENTION

In accordance with the present invention, a processing apparatus is provided for attaining a uniform spread of processing fluid over the photochemical composition carried by the surface of one or more photographic sheets, in which the effective radii of functioning roller surfaces are maximized without corresponding increase in space requirements, by employing cooperating and generally cylindrical roller segments to define a processing gap through which one or more photographic film sheets are passed simultaneously. In addition, the processing apparatus of the invention is especially well suited to the processing of discrete self-developing film components, thereby avoiding the need for preassembled film units.

In one embodiment of the invention, a pair of semicylindrical processing rollers define a V-shaped receiving trough into which a discrete pod of processing fluid may be dropped in a manner to position subsequently introduced positive and negative film sheets, for example, properly for processing. Operation of this embodiment involves first rupturing the pod of processing fluid using surfaces having essentially infinite radii followed by the relatively large radius of semicylindrical surfaces. In an alternative embodiment, cylindrical quadrants are employed to provide the processing roller pair.

A principal object of the invention is, therefore, to provide a processing apparatus for photographic sheet materials by which the roller radius deployed for the spread of processing fluid over the area between the sheets is maximized without substantial compromise in the spacial requirements of the rollers. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
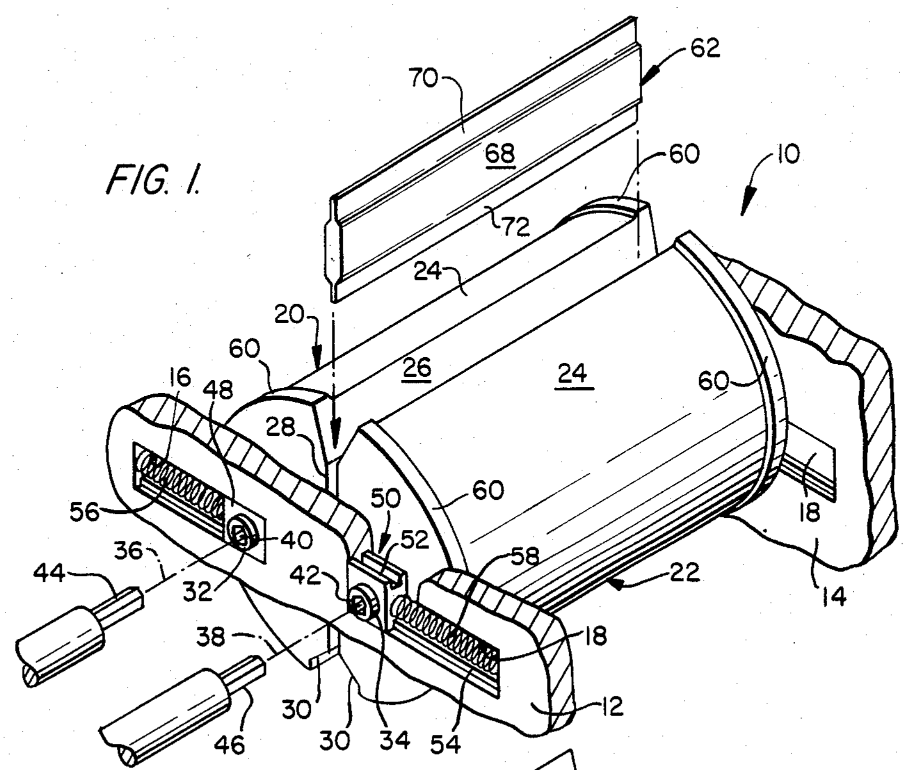
FIG. 1 is a perspective view illustrating one embodiment of the processing apparatus of the present invention.
Figure 2:
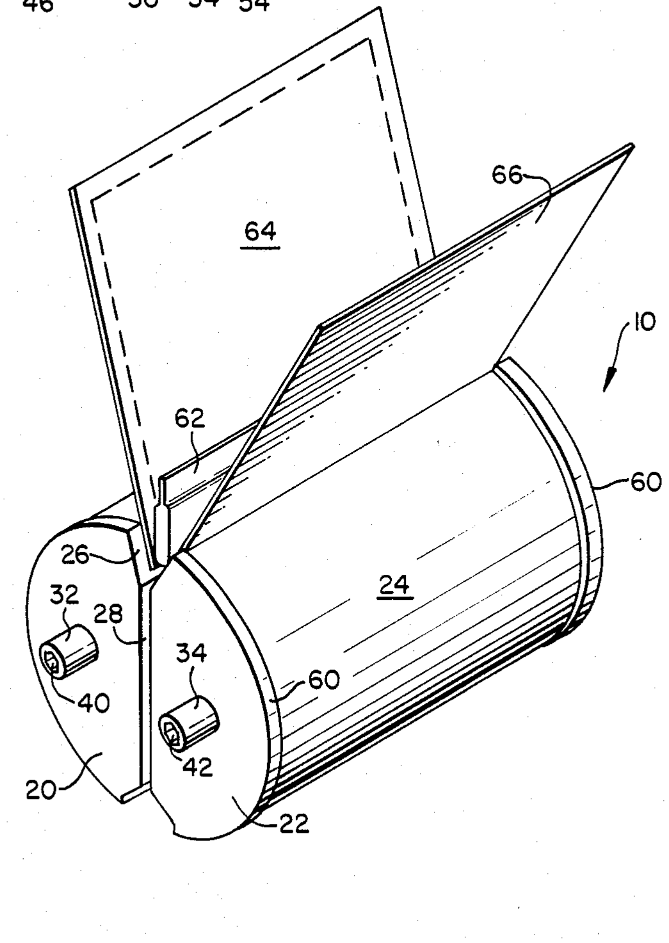
FIG. 2 is a similar but simplified view of the apparatus shown in relation to all of the photographic components in place for processing.
Figure 3:
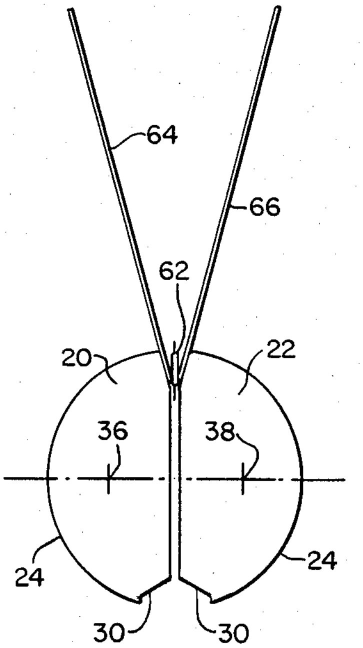
FIGS. 3–7 are schematic views illustrating progressive positioning of the components in the processor of FIG. 1 during a processing cycle.
Figure 6:
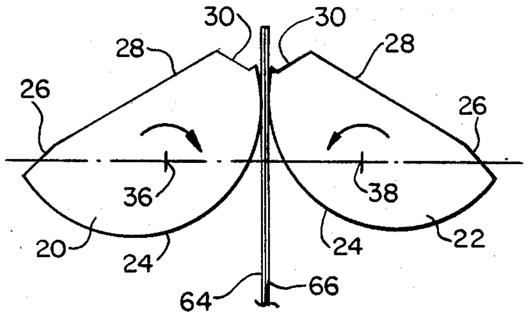
Figure 7:
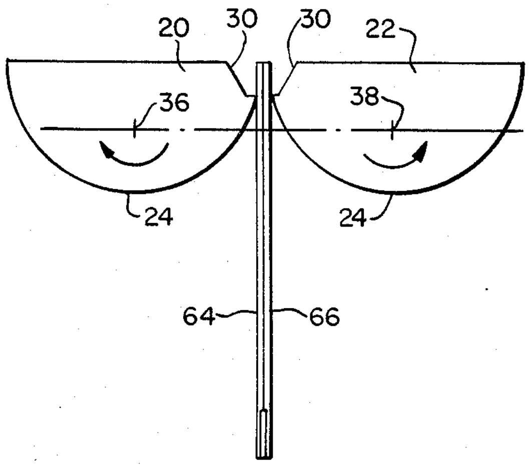
Figure 4:
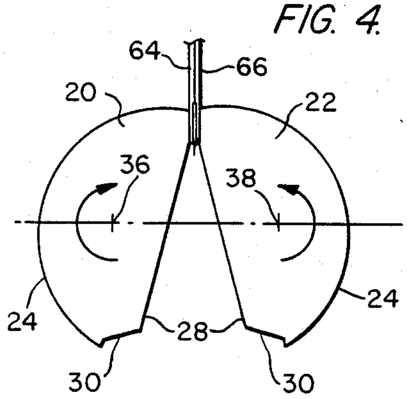
Figure 5:
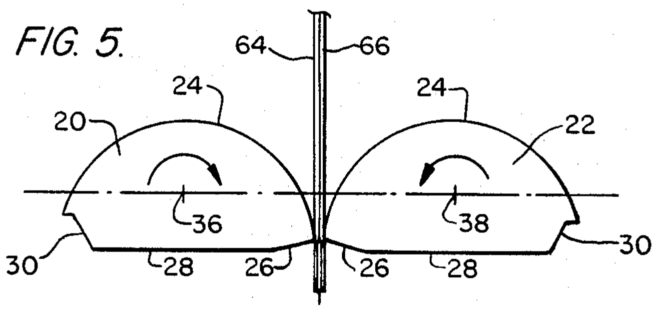

In FIGS. 1 and 2 of the drawings, the major components of an embodiment of the invention are shown in a processor generally designated by the reference numeral 10. The processor 10 is supported in an enclosure only partially shown in these drawing figures to include a pair of spaced parallel walls 12 and 14, each having a pair of slot-like openings 16 and 18. In practice, the walls 12 and 14 may be in the nature of support structures such as plates or flanges mounted within a cabinet (not shown) or other dark chamber-defining enclosure in which the processor 10 is to be used.

The processor 10 includes a pair of rotatable calender members 20 and 22, each having a semi-cylindrical roller surface 24, an inclined flat surface 26, a flat chordal surface 28, and a step-like recess 30 extending between the chordal surface 28 and the edge of the semicylindrical surface 24 opposite from the inclined flat surface 26. Stub axles 32 and 34 extend from opposite ends of the members 20 and 22 on parallel axes 36 and 38, respectively. The stub axles on at least one end of the members 20 and 22, in the illustrated embodiment, are formed with non-circular sockets 40 and 42 to receive complementing rotatable drive shafts 44 and 46 adapted to be driven by a source of rotary power (not shown). For reasons which will become apparent from the description to follow, the shafts 44 and 46 are flexible or at least movable laterally to provide continuity of rotational drive to the axles 34 and 36 as the axes 36 and 38 undergo lateral movement toward and away from each other. Also, it will be appreciated that specific rotatable drive organizations for rotating the members 20 and 22 about the axes 36 and 38, other than that illustrated in the drawings, may be used in the processor of the invention.

As shown in FIG. 1 of the drawings, the stub axles 32 and 34 at opposite ends of the calender members 20 and 22 are rotatably supported in bearing blocks 48 and 50 which, in turn, are slidably guided by the slot-like openings 16 and 18, respectively, between an inboard position and an outboard position, both such positions being delimited by engagement of the bearing blocks 48 and 50 with the ends of the slot-like openings 16 and 18. The bearing blocks 48 and 50 are provided with guide slots 52 to receive linear ways 54 provided at opposide side edges of the openings 16 and 18. Also, it will be noted that the guide blocks are biased toward their inboard position by compression springs 56 and 58, respectively. Although the organization of stub axles 32 and 34, bearing blocks 48 and 50, springs 56 and 58 and openings 16 and 18 are shown in FIG. 1 to support the members 20 and 22 only at one end, the opposite ends of the members 20 and 22, not visible in FIG. 1, are supported in identical fashion.

It will be noted that the semi-cylindrical calendering surfaces 24 on the respective members 20 and 22 extend axially or longitudinally between rail-like end portions 60 which are of a radius slightly larger than the radius defining the surfaces 24. Thus, when the members are rotated in a manner to be described below, so that the end portions or rails 60 on the respective members 20 and 22 abuttingly engage each other, the surfaces 24 will be held in a slightly spaced relationship along their length and with respect to each other.

Because of the manner in which the calender members 20 and 22 are supported and in the absence of torque application to the stub axles 32 and 34 by the drive shafts 44 and 46, the members will assume as a normal or initial condition, the orientation illustrated in FIGS. 1, 2, 3 and 8 of the drawings. In the normal condition, the flat chordal surfaces 28 lie in mutually facing, spaced relationship to establish a vertical gap between the members 20 and 22. The gap thus defined terminates at its upper end in a V-shaped trough defined by the inclined flat surfaces 26 on the members 20 and 22. The step-like recesses 30 at the bottom of the processor establish a longitudinal recess in the overall cylindrical periphery defined by the surfaces 24.

While the processor 10 may be used with preassembled film units conventionally employed in the instant photography art merely by introducing the leading or fluid pod end of such a unit into the V-shaped trough defined by the inclined flat surfaces 26, it is particularly well suited to the processing of photographic materials which are introduced to the processor as discrete components. In this latter respect, therefore, the operation of the processor 10 will be described with reference to such discrete components including a processing fluid pod 62, an exposed negative sheet 64 and a positive sheet 66 to which a latent image on the negative sheet 64 will be transferred in accordance with the well known diffusion transfer process applicable to instant photography. The pod 62 is conventionally formed of foil-like sheet material and is of a length corresponding to the width of the negative and positive sheets 64 and 66 to be processed. The pod conventionally employs a central receptacle portion 68 joining at opposite edges as adhesively secured hems to define marginal lips 70 and 72.

Processing is initiated by dropping a pod 68 into the V-shaped trough established by the inclined flat surfaces 26 on the members 20 and 22 while the members are in the orientation illustrated in FIGS. 1, 2, 3 and 8 of the drawings. As may be seen most clearly in FIG. 8, the dimensions of the pod 62, particularly the container portion 68 thereof, is related to the vertical gap defined by the flat chordal surfaces 28 so that the pod will rest against the inclined surfaces 26 of the members 20 and 22 in their normal condition. The lower lip 72 of the pod 62 will depend into the vertical gap between the surfaces 28. With the pod 62 in place, the negative and positive sheets 64 and 66 are dropped into the V-shaped trough against the inclined surfaces 26 and will come to rest against the pod 62 and in position for initiation of a processing cycle.

Operation of the processor 10 through a complete processing cycle is depicted by the illustrations in FIGS. 3–7 of the drawings. Thus, once the photographic components, including the negative and positive sheets 64 and 66 together with the processing fluid pod 62, are received in the V-shaped trough at the top of the members 20 and 22 as described above and as shown in FIG. 3, the drive shafts 44 and 46 are operated to drive the members 20 and 22 rotatably in the direction of the arrows superimposed on the outline of the members 20 and 22 in FIGS. 4–7.

Figure 8:
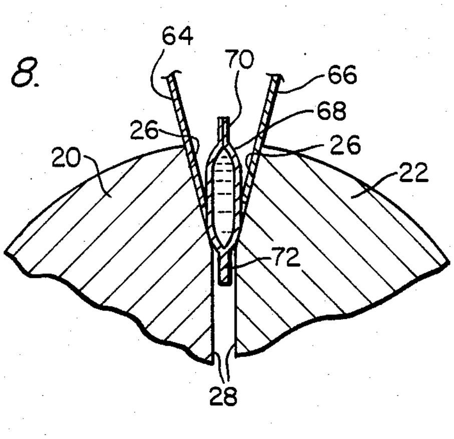
FIGS. 8–10 are enlarged fragmentary cross-sections illustrating the initial pod rupturing operating of the invention.
Figure 9:
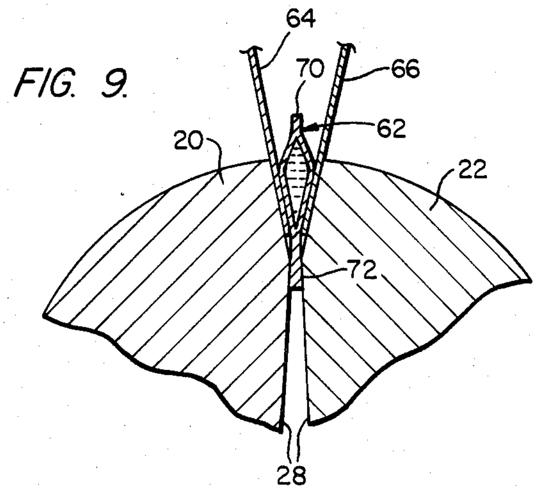
Figure 10:
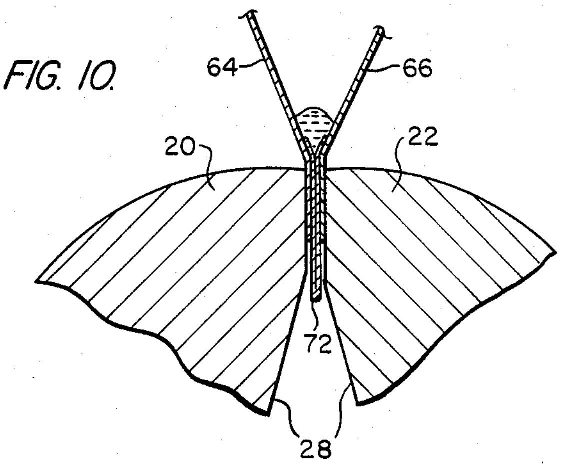

The complete cycle of processor operation may be characterized as including a pod rupturing phase followed by a fluid spreading phase and a discharge of the processed sheets 64 and 66 from the processor 10. The pod rupturing phase of the cycle of operation is illustrated most clearly in FIGS. 8–10 of the drawings. Specifically, upon rotation of the members 20 and 22 from the normal position previously described and as shown in FIG. 8, to the position illustrated in FIG. 9, the lower lip 72 of the processing fluid pod 62 will first be seized or gripped by the members 20 and 22 at the juncture of the chordal surfaces 28 and the inclined surfaces 26. At this point in the operation, the pod 62 will be altered in its configuration but will not be ruptured to discharge the contents thereof. Continued rotation of the members 20 and 22 to the position illustrated in FIGS. 4 and 10, however, will effect a progressive squeezing action of the inclined surfaces 26 toward one another and against the lower edge of the negative and positive sheets 64 and 66 and pod 62. Such progressive pressure exerted at the leading edge of the photographic components will cause the upper lip 70 of the pod 62 to rupture in a manner such that the full contents of the pod will be positioned between the sheets 64 and 66 substantially as shown in FIG. 10 of the drawings. Continued rotation of the members 20 and 22 and correspondingly at this stage of operation, outward movement of the rotational axes 36 and 38, will cause the sheets 64 and 66 will come into engagement with the semi-circular calendering surfaces 24 under a pressure established by the springs 56 and 58 but limited by the radius differential between the calendering surfaces 24 and the combined height of the rail-like end portions 60. Further continued rotation of the members will advance the sheets 64 and 66 downwardly and simultaneously spread the processing fluid originating in the pod 62 throughout the full length of the sheets 64 and 66.

As the trailing ends of the sheets 64 and 66 approach the ends of the surfaces 24 of the members 20 and 22, such trailing ends register with the recesses 30 in the semi-cylindrical surfaces 24 so as to allow any residual processing fluid, which is left after the surfaces between the sheets 64 and 66 are completely and properly covered, to remain at the terminal ends. When the composite of sheets are discharged from the processor, they are peeled apart in traditional fashion to retain positive sheet 66 and to discard the negative sheet 64 and spent pod 62.

In the two-stage processing cycle effected by the processor 10, therefore, the pod rupturing phase, being effected by the flat surfaces 26, is accomplished by calendering surface having an infinite radius whereas the subsequent spreading of the processing fluid between the two sheets is effected by the relatively large diameter or radius of the semi-cylindrical calendering surfaces 24. Yet, the spacial requirements for accommodating the relatively large radii of calendering surfaces is minimized.

Figure 11:
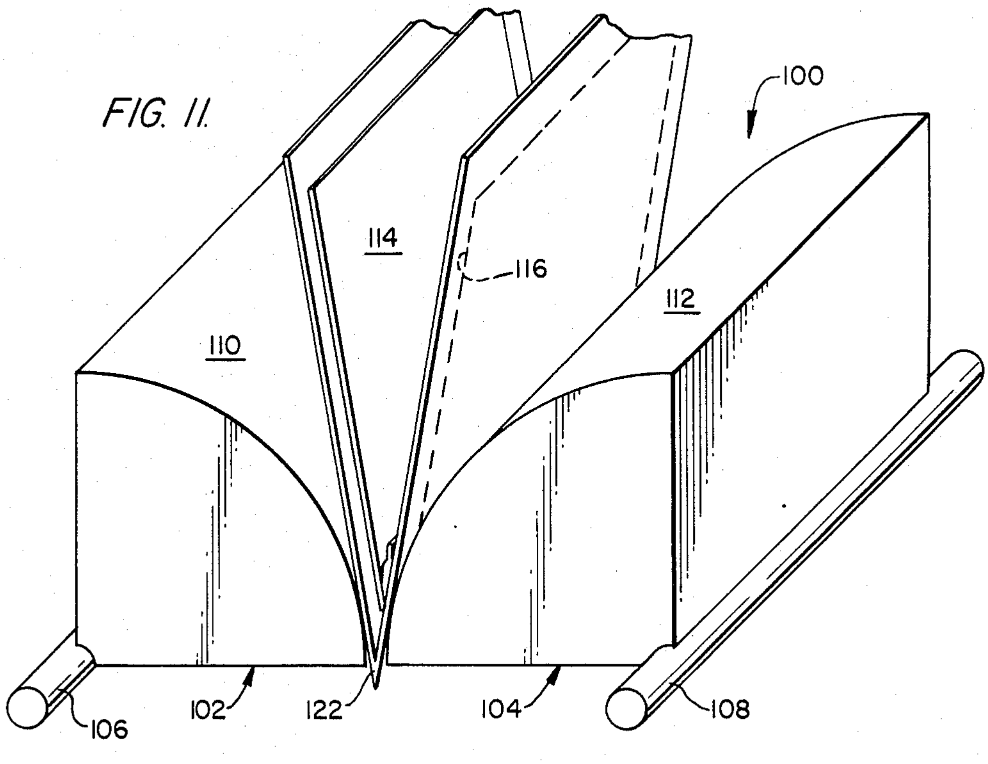
FIG. 11 is an isometric view illustrating an alternative embodiment of the present invention.
Figure 12:
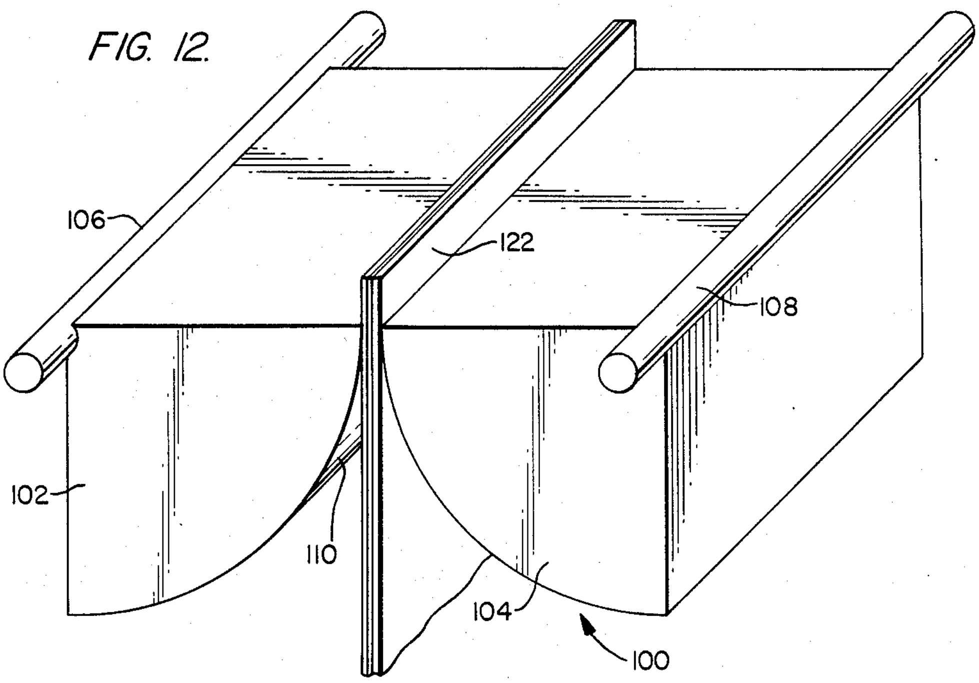
FIG. 12 is a similar view of the apparatus shown in FIG. 11 but in a different operative condition.

In FIGS. 11 and 12 of the drawings, an alternative embodiment of the invention is shown in a processor designated generally by the reference numeral 100. In the processor 100, a pair of calendering members 102 and 104 are supported respectively for rotation on pivot axles 106 and 108 between initial and terminal positions shown respectively in FIGS. 11 and 12.

The members 102 and 104 have calendering surfaces 110 and 112 which approximate the quadrants of a cylinder concentric with the axles 108. The radius of the cylindrical quadrants 110 and 112 is selected so that the circumferential length of each quadrant approximates the length of a photographic sheet or sheets to be processed.

The principal advantage of the embodiment 100 is that the rotational axis of the calender members 102 and 104 may be fixed or preferably, adjustably fixed, so that the processing gap established between the surfaces 110 and 112 may be adjusted independently of any formation projecting from the surfaces 110 and 112. The processor 100 is also adapted to handle discrete photographic components such as a negative sheet 114, a positive sheet 116 and a pod 118 of processing fluid.

In use of the processor 100, the members 102 and 104 are initially positioned in an orientation shown in FIG. 11. In this orientation, the surfaces 110 and 112 converge toward one another near the lower end thereof but are spaced by an amount corresponding to a preselected processing gap 120. To prevent the pod 118 from advancing through the gap 120, a folded cover sheet 122 is used to place the photographic components between the members 102 and 104. The cover sheet 122 is formed of absorbent material such as paper and is larger than the areas of the negative and positive sheets 114 and 116 so that any processing fluid projecting beyond the edges of the photographic sheets 114 and 116 will be absorbed by the V-shaped or folded cover sheet 122.

Processing in this embodiment is effected by rotation of the members 102 and 104 from the position illustrated in FIG. 11 to the position illustrated in FIG. 12. When reaching the terminal position shown in FIG. 12, the ends of the cover sheet 122 will project beyond the ends of the calendering surfaces 110 and 112 and thus accommodate any residual processing fluid that may be spread beyond the edges of the photographic sheets 114 and 116. Further rotation of the quadrants 102 and 104 will discharge the assembly of the photographic sheets and the folded cover sheet downwardly for subsequent manual separation of the ultimate photographic print on the sheet 116 from the negative sheet 114 and cover sheet 122.

Thus, it will be appreciated that as a result of the present invention, a highly effective processor for photographic sheet materials is provided and by which the principal objectives, among others, are completely fulfilled. It is contemplated that modifications and/or changes may be made in the illustrated embodiments without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A processor for advancing a predetermined quantity of processing fluid as a uniform layer over mutually facing surfaces between a pair of juxtaposed photographic sheets, said processor comprising:

a pair of calendering members, each having a calendering surface defined by a cylindrical sector and having a circumference approximating the length of the sheets;

means for supporting said calendering members rotatably about spaced parallel axes so that the respective calendering surfaces of said members define a processing gap; and means for rotating said members to advance the sheets through said processing gap.

2. The apparatus recited in claim 1 wherein said cylindrical sector is a quadrant.

3. The apparatus recited in claim 2 wherein said means for supporting said calendering members comprises axles fixed to establish said processing gap between said calendering surfaces.

4. The apparatus recited in claim 1 wherein said cylindrical sector is approximately semi-cylindrical.

5. The apparatus recited in claim 4 wherein said means for supporting said calendering members comprises movable bearing means to vary the space between said axes.

6. The apparatus recited in claim 4 wherein said members each includes a flat chordal surface and an inclined flat surface extending between said chordal surface and one end of said calendering surface to establish a V-shaped trough between said members when said chordal surfaces are positioned in mutually facing relationship.

7. The apparatus recited in claim 4 including semi-cylindrical, rail-like end portions on at least one of said members to space said calendering surfaces at said processing gap.

8. The apparatus recited in claim 7 wherein said means for supporting said calendering members comprises movable means to vary the space between said axes and including yieldable means for retaining the calendering surfaces of said members at said processing gap.

9. Photographic apparatus comprising in combination:

a discrete pod of processing fluid including a rupturable foil-like enclosure having an enlarged central receptacle portion lying between a pair of oppositely extending lip portions;

a pair of discrete sheet components, at least one of which is photochemically reactive with said processing fluid to provide a photographic image; and processing means comprising a pair of calendering members, each having a calendering surface defined by a cylindrical sector and having a circumference approximating the length of the sheets, means for supporting said calendering members rotatably about spaced parallel axes so that the respective calendering surfaces of said members define a processing gap, and means to position said pod between said sheets so that upon progressive rotary motion of said calendering members, said pod is ruptured and the contents thereof spread uniformly throughout the length of said sheets.

10. The apparatus recited in claim 9 wherein said cylindrical sector is a quadrant.

11. The apparatus recited in claim 9 wherein said means for supporting said calendering members comprises fixed axles to establish said processing gap between said calendering surfaces and wherein said means to position said pod between said sheets comprises a V-folded cover sheet initially supported between said calendering surfaces.

12. The apparatus recited in claim 9 wherein said cylindrical sectors are approximately semi-cylindrical and wherein each of said members includes a flat chordal surface and an inclined flat surface extending between said chordal surface and one end of said calendering surface to establish a V-shaped trough between members when said chordal surfaces are positioned in mutually facing spaced relationship, at least the enlarged central receptacle portion of said pod being larger than the spacing between said chordal surfaces so as to nest in said V-shaped trough.

13. The apparatus recited in claim 12 including drive means for simultaneously rotating said calendering members to progressively close said V-shaped trough and then bring said semi-cylindrical calendering surfaces progressively into engagement with said sheets.

14. The apparatus recited in claim 13 comprising a step-like notch in each of said semi-cylindrical surfaces to receive the trailing edges of said sheets as they are passed between said members.

* * * * *